United States Patent [19]
Irick, Jr.

[11] Patent Number: 5,242,880
[45] Date of Patent: Sep. 7, 1993

[54] PHOTOACTIVE CATALYST OF BARIUM PHOSPHATE OR CALCIUM PHOSPHATE SUPPORTED ON ANATASE TITANIUM DIOXIDE

[75] Inventor: Gether Irick, Jr., Gray, Tenn.

[73] Assignee: Eastman Kodak Company, Rochester, N.Y.

[21] Appl. No.: 889,326

[22] Filed: May 27, 1992

[51] Int. Cl.$^5$ .................. B01J 23/02; B01J 27/18
[52] U.S. Cl. ..................................................... 502/208
[58] Field of Search ........................ 502/208, 217, 218

[56] References Cited

U.S. PATENT DOCUMENTS

| | | | |
|---|---|---|---|
| 3,561,968 | 2/1971 | Damtro | 96/88 |
| 3,674,747 | 7/1972 | Schnegg et al. | 502/208 X |
| 3,709,984 | 1/1973 | Damtro | 423/610 |
| 4,022,632 | 5/1977 | Newland et al. | 106/193 J |
| 4,485,189 | 11/1984 | Dupin | 502/217 |
| 5,137,855 | 8/1992 | Hegedus et al. | 502/217 X |

FOREIGN PATENT DOCUMENTS 1073581  8/1980  Canada .

OTHER PUBLICATIONS

Permanence of Organic Coatings, American Society for Testing and Materials, "Prediction of the Influence of Titanium Dioxide on Polymer Weathering," Irick et al, 1982, pp. 35-42.

Effect of Metal Salts on the Photoactivity of Titanium Dioxide, Irick, Jr., et al, American Chemical Society, 1981, pp. 147-162.

$TiO_2-$, ZnO—, and CdS-Photocatalyzed Oxidation of Ethylene-Propylene Thermoplastic Elastomers, Lacoste et al, Journal of Polymer Science; Part A: Polymer Chemistry, 1987, vol. 25, 2799-2812.

The Chem. Nature of Chalking in the Presence of Titanium Dioxide Pigments, Volz et al, Bayer, AG, D-4150 Krefeld 11 & D-5090 Leverkusen, W. Germany, 1981, American Chem. Soc., pp. 163-182.

Effects of Titanium Dioxide on the Weatherability of Thermoplastic Polymers, Irick et al, American Society for Testing & Materials, 1980, pp. 853-862.

*Primary Examiner*—W. J. Shine
*Attorney, Agent, or Firm*—Bernard J. Graves, Jr.; William P. Heath, Jr.

[57] ABSTRACT

Provided are novel titania comprising anatase titanium dioxide and sodium, potassium, calcium, magnesium, barium, zinc, or magnesium salts of sulfuric or phosphoric acid. The titania of this invention are useful in the pigmentation of oxidizable polymers, while at the same time providing a catalyst system for the photooxidation of said oxidizable polymers.

10 Claims, No Drawings

PHOTOACTIVE CATALYST OF BARIUM PHOSPHATE OR CALCIUM PHOSPHATE SUPPORTED ON ANATASE TITANIUM DIOXIDE

FIELD OF THE INVENTION

This invention relates to the field of inorganic chemistry. In particular, this invention relates to photoactive titania pigments. The photoactive catalysts of this invention are useful in the catalysis of photodegradation of oxidizable polymers.

BACKGROUND OF THE INVENTION

Increasing concern over the environmental fate of plastic materials has prompted considerable research into ways to increase the biodegradation of such products. As part of this effort, catalysts have been sought which would increase the rate of photooxidation of oxidizable polymers. It is known that white pigments vary greatly in their photooxidation activities, and that these pigments can significantly influence the weathering rates of polymers in which they are incorporated (see, for example Irick, et al., ACS Adv. in Chem. Series #151, pp. 147–162 (1981); Irick, et al., "Durability of Building Materials and Components", ASTM STP 691, P. J. Sereda and G. G. Litvan, Eds., ASTM, 1980, pp. 853–862; Irick, et al., "Prediction of the Influence of Titanium Dioxide on Polymer Weathering", Permanence of Organic Coatings, ASTM STP 781, pp. 35–42 (1982); H. G. Volz, et al., ACS Symp. Series 151, "Photodegradation and Photostabilization of Coatings", ACS, Washington, 1981, 163–182; and J. Lacoste, et al., J. Polym. Sci. Part A, 25 (10), 2799–2812 (1987)). Further, U.S. Pat. No. 4,022,632 teaches that pigment activities can be lowered by the addition of various metals to their surfaces. The present invention, as described below, provides novel pigments which markedly enhance the rate of photodegradation of oxidizable polymers. These pigments are comprised of anatase titanium dioxide containing metal salts of sulfuric acid or phosphoric acid.

SUMMARY OF THE INVENTION

The present invention provides novel titania comprising anatase titanium dioxide and sodium, potassium, calcium, magnesium, barium, zinc, or magnesium salts of sulfuric or phosphoric acid. The titania of this invention are useful in the pigmentation of oxidizable polymers, while at the same time providing a catalyst system for the photooxidation of said oxidizable polymers. When used in conjunction with cellulose ester fibers, for example, the catalysts of the present invention contribute to the biodegradability of the fibers when exposed to ordinary surface litter environmental conditions.

DETAILED DESCRIPTION OF THE INVENTION

The present invention provides novel titanium dioxide catalysts preferably containing from about 2 to 30 weight percent of sodium sulfate, potassium sulfate, or magnesium, calcium, zinc, or barium salts of phosphoric or sulfuric acids. The most highly preferred salts are calcium sulfate and calcium phosphate. These salts can be incorporated into the titanium dioxide during manufacture and forming, or they can be applied to the surface of the titanium dioxide after it has been formed into its final shape (powder, pellets, monoliths, etc.). While titanium dioxide pigments containing salt amounts lower than 2% by weight and higher than 30% by weight will show photooxidation activity, the maximum activity will be exhibited in the range of 2–30% by weight, with the most preferred and optimum range being 4–15% by weight. These new compositions can be incorporated into oxidizable polymers such as cellulose esters, in particular, cellulose acetate; polypropylene, polyethylene, and other polyolefins; and other oxidizable polymers by any convenient method, thereby enhancing the rate of photodegradation of said polymer and rendering them more environmentally acceptable. Other oxidation enhancing materials may be used with these pigments if desired.

Thus as one aspect of the present invention, there is provided a photoactive catalyst comprising anatase titanium dioxide having incorporated therein or coated thereon one or more salts selected from sodium sulfate, potassium sulfate, calcium sulfate, zinc sulfate, magnesium sulfate, and barium sulfate.

As a further aspect of the present invention, there is provided a photoactive catalyst comprising anatase titanium dioxide having incorporated therein or coated thereon one or more salts selected from zinc phosphate, magnesium phosphate, calcium phosphate, and barium phosphate.

Experimental Section

EXAMPLE 1

Preparation of a Cellulose Acetate Test Solution

A 350 g sample of cellulose acetate dissolved in acetone was diluted to 3500 mL with acetone and stirred until homogeneous. The acid number of this "stock solution" was 0.025. Evaporation of an aliquot to dryness gave cellulose acetate film having an inherent viscosity of 1.32 g dL as measured in a 60/40 (wt./wt.) phenol/tetrachloroethane solution).

EXAMPLE 2

Irradiation of Pigments to Demonstrate Photodegradation Activity

To a 300 mL PYREX round bottomed flask containing a magnetic stirring bar and fitted with a condenser open to the atmosphere, was added 2.0 g of the pigment and 150 mL of the acetone solution of cellulose acetate described in Example 1. The flask was placed on a magnetic stirrer inside a Rayonet Photochemical Reactor fitted with 16 350 nm fluorescent lamps. Irradiation with stirring was done at 31° C. for various periods of time. Pigment was removed by centrifugation and the liquid was titrated to determine rates of formation of carboxylic acid degradation products.

EXAMPLE 3

Preparation of Barium Sulfate Coated Titanium Dioxide

TIOXIDE A-HR (20g) (Titanium dioxide, Tioxide America, Inc.) was added to a solution of 2.0 g of barium chloride dihydrate in 25 mL of distilled, deionized water. The slurry was stirred for 0.5 h at 90° C. and was then evaporated to dryness with manual stirring. The white solid was suspended in 150 mL of methanol and stirred during addition of a solution consisting of 1.5 g of 97% conc. sulfuric acid in 25 mL of water. The slurry was filtered, washed with 65° C. water, re-slurried in 250 mL of 65° C. water, filtered, washed again and distilled water, and dried at 80° C. The title compound was provided (21 g) as a white solid containing 91.3 and 8.7 weight percent, respectively of titanium dioxide and barium sulfate.

EXAMPLES 4-11

Preparation of other Salt Coated TIOXIDE A-HR Pigments

Where the desired salts were soluble in water, the pigments were prepared by evaporating aqueous slurries of the salts and TIOXIDE A-HR to dryness with continuous stirring. Where the salts were insoluble, they were prepared by the general method described for barium sulfate coated sample (Example 3). See Table 2 below for a listing of salts prepared and data demonstrating their photodegradation activities. Note also that sodium phosphate is not a photoactive composition.

Test Methods

The screening test designed for determining pigment photoactivity is a modification of an isopropyl alcohol oxidation test. Adsorption of the oxidizable substrate on the pigment surface is followed by hydrogen abstraction and oxygen addition initiated by positive holes (oxidizing sites) formed on the pigment surface by absorption of light at wavelengths below about 390 nm. Acidic oxidation products are formed from cellulose ester oxidation. Concentrations of these are determined by titration and serve as a measure of pigment activity.

Baseline data was generated for commercially available pigments for comparison with new systems designed for higher photooxidation activity. TIOXIDE A-HR gives a high initial rate of photooxidation (Table 1), but this rate falls from 33 during the first 4 hours to 15 for the first 18 hours and then drops to zero. It is probable that the pigment surface becomes coated with degradation products, thereby shielding it from fresh, unoxidized cellulose acetate. A reagent anatase showed about 27% higher activity than A-HR after 17 hours irradiation. No data was obtained for longer irradiation times.

Several salt coated anatase pigments were prepared in an attempt to increase the activity, and to overcome the problem of pigment activity ceasing after a moderate period of cellulose ester oxidation (Table 2). Both goals were achieved. Both barium and calcium sulfates provided higher rates than uncoated A-HR, and showed no evidence of their oxidation activity stopping after up to 54 hours of irradiation. Calcium phosphate exhibited initial activity similar to A-HR, but continued to provide oxidation through 64 hours of exposure. Good initial activity was also observed for zinc sulfate and barium sulfate; these were not evaluated beyond 18 hours.

These results show that the modified titanias of the present invention exhibit superior catalytic activity for the photodegradation of oxidizable polymers, in particular, cellulose esters.

TABLE 1

| Photoactivities of Anatase Pigments Containing No Salts | | | |
|---|---|---|---|
| Pigment | Irradiation Time, Hours | Acid Number | Acid Rate, Micromoles/h |
| TIOXIDE A-HR | 4 | 0.13 | 33 |
| | 18 | 0.27 | 15 |
| | 40 | 0.26 | 6 |
| Reagent Anatase | 17 | 0.32 | 19 |
| UNITANE OR-450 (Kemira, Inc.) | 43 | 0.05 | 0.5 |

Note -
Acid number of the unirradiated cellulose acetate solution was 0.03.

TABLE 2

| Photoactivity of Salt Containing Anatase Pigments | | | | |
|---|---|---|---|---|
| Salt$^a$ | Example No. | Irradiation Time, h | Acid Number* | Acid Rate μmoles/h |
| BaSO$_4$$^b$ | 4 | 18 | 0.44 | 24 |
| | 4 | 19 | 0.64 | 34 |
| MgSO$_4$ | 5 | 18 | 0.14 | 8 |
| ZnSO$_4$ | 6 | 18 | 0.23 | 13 |
| CaSO$_4$ | 7 | 18 | 0.39 | 22 |
| | 7 | 54 | 0.92 | 17 |
| Na$_2$SO$_4$ | 8 | 18 | 0.19 | 11 |
| Ba$_3$(PO$_4$)$_2$ | 9 | 18 | 0.21 | 12 |
| Ca$_3$(PO$_4$)$_2$ | 10 | 18 | 0.23 | 13 |
| | 10 | 64 | 0.58 | 9 |
| Na$_3$PO$_4$ | 11 | 18 | 0.06 | 3 |

$^a$Salt concentrations in these examples were 0.41 mmole/g of anatase titanium dioxide.
$^b$The 18 and 19 h runs were with duplicate preparations of coated pigments.
*Determined as mg KOH/g

I claim:

1. A photoactive catalyst comprising anatase titanium dioxide having incorporated therein or coated thereon one or two salts selected from calcium phosphate and barium phosphate.

2. The photoactive catalyst of claim 1, wherein the salt is present in a concentration of about 2 to 30 weight percent.

3. The photoactive catalyst of claim 1, wherein the salt is present in a concentration of about 4 to 15 weight percent.

4. The photoactive catalyst of claim 1, wherein the salt is calcium phosphate.

5. A photoactive catalyst consisting essentially of anatase titanium dioxide having incorporated therein or coated thereon one or two salts selected from calcium phosphate and barium phosphate.

6. The photoactive catalyst of claim 5, wherein the salt is present in a concentration of about 2 to 30 weight percent.

7. The photoactive catalyst of claim 5, wherein the salt is present in a concentration of about 4 to 15 weight percent.

8. The photoactive catalyst of claim 5, wherein the salt is calcium phosphate.

9. The photoactive catalyst of claim 1, wherein the salt is barium phosphate.

10. The photoactive catalyst of claim 5, wherein the salt is barium phosphate.

* * * * *